UNITED STATES PATENT OFFICE.

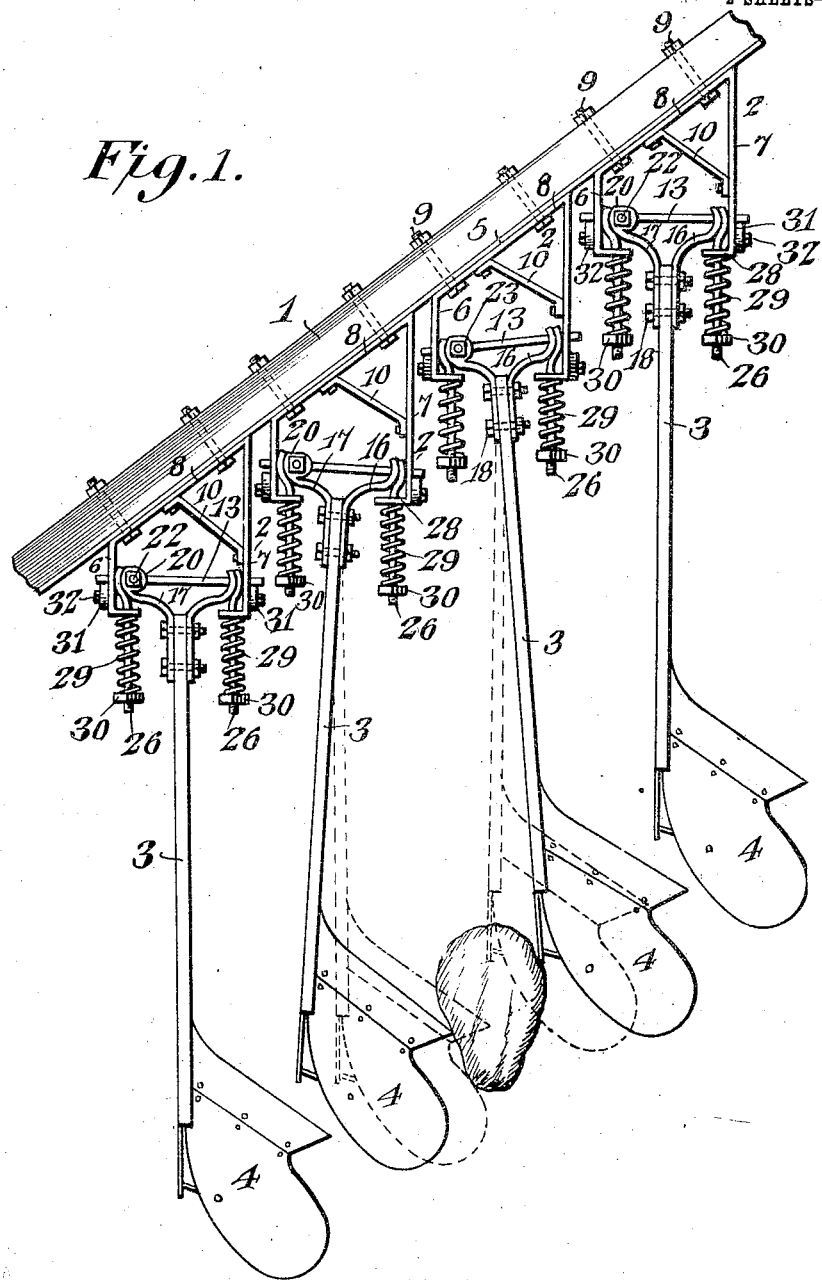

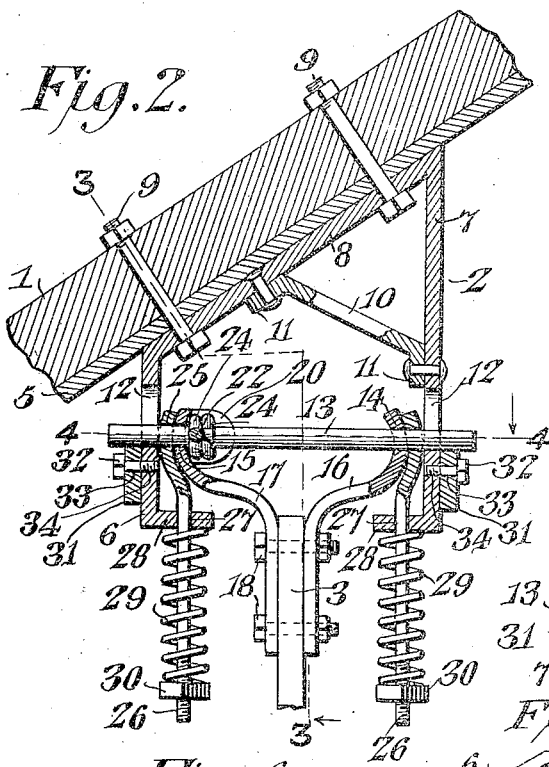

WILLIAM THOMAS BENNETT, OF SIOUX FALLS, SOUTH DAKOTA.

FLEXIBLE CONNECTION FOR GANG-PLOWS.

1,085,190.  Specification of Letters Patent.  Patented Jan. 27, 1914.

Application filed June 29, 1912. Serial No. 706,710.

*To all whom it may concern:*

Be it known that I, WILLIAM T. BENNETT, a citizen of the United States, residing at Sioux Falls, in the county of Minnehaha and State of South Dakota, have invented a new and useful Flexible Connection for Gang-Plows, of which the following is a specification.

The invention relates to improvements in gang plows.

The object of the present invention is to improve the construction of gang plows, and to provide a simple and inexpensive device of strong and durable construction, designed for connecting the plow beams of a gang of plows to the transverse draft beam of an engine gang plow, and adapted when a plow strikes a rock or other obstruction to permit such plow to swing out of line until it passes such obstruction to prevent the plow from being bent or otherwise injured and also from interfering with the operation of the other plows of the gang.

A further object of the invention is to provide a yieldable or flexible connection of this character, capable of automatically returning a deflected plow to its proper position and adapted to permit a plow to be adjusted to arrange it in line with the other plows and to cause the plow to run true when plowing in a straight line or on a curve.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a portion of a gang plow, showing a plurality of plows equipped with flexible connections, constructed in accordance with this invention. Fig. 2 is an enlarged horizontal sectional view of one of the flexible connections. Fig. 3 is a longitudinal sectional view on the line 3—3 of Fig. 2. Fig. 4 is a transverse sectional view on the line 4—4 of Fig. 2. Figs. 5 and 6 are detail perspective views of the arms of the plow beam. Fig. 7 is a detail perspective view of one of the supporting brackets.

Like numerals of reference designate corresponding parts in all the figures of the drawings.

In the accompanying drawings in which is illustrated the preferred embodiment of the invention, 1 designates a diagonally arranged draft bar or member constituting a portion of a gang plow frame of any preferred construction and having mounted upon it a series of bearing brackets 2 to which beams 3 of plows 4 are connected. As each of the connections is of the same construction, a description of one will suffice for all. The diagonally arranged bar or beam 1 is shown constructed of wood and reinforced at the rear face by a metallic bar 5, but it may be of any other preferred construction, as will be readily understood.

The bearing bracket is composed of parallel sides 6 and 7 of unequal length, connected at the front by an angularly disposed transverse portion 8, fitted against the rear face of the diagonally disposed bar 1 and secured to the same by spaced bolts 9, piercing the bar 1, its reinforcing bar 5 and the angularly disposed connecting portion 8. The front connecting bar is arranged at an acute angle to the long side 7, and an angularly disposed brace 10, which is located within the bracket, extends from the central portion of the side 7 to the central portion of the front connecting bar. The terminals 11 of the brace 10 are bent at an angle to fit the inner faces of the front portion 8 and the side 7 of the bracket and are riveted or otherwise secured to the same.

The sides 6 and 7 are provided at diametrically opposite points with horizontal longitudinal slots 12, receiving the terminal portions of a transverse pivot 13, which also passes through openings 14 and 15 of arms 16 and 17 of the plow beam 3, whereby the plow 4 is capable of a vertical swinging movement and also a lateral movement. The slots 12 permit the transverse pivot to have a backward and forward movement in the frame, and either terminal portion of the transverse pivot is adapted to swing forwardly while the other terminal portion of the pivot remains at and is fulcrumed against the rear wall of the slot in which it operates. Thus the transverse pivot has a horizontal swinging movement to accommodate itself to the lateral movement of the plow beam. The arms 16 and 17 are secured by bolts 18 to the side faces of the front portion of the plow beam 3, and they diverge forwardly therefrom and are slightly curved to present outer convex faces at their terminal portions to facilitate a lateral swinging movement or adjustment of the plow. The opening 14 of the arm 16 is circular, but is of slightly greater diameter than the transverse pivot 13. The slot or opening 15 is vertical and is formed in a vertical head 19 of the arm 17. The head 19, which is integral with the arm 17, projects above and below the same and is provided with inwardly extending approximately horizontal ears 20, arranged in parallelism and provided with alined openings 21, receiving adjusting devices consisting of eye bolts 22, equipped at their outer portions with nuts 23 and provided at their inner ends with eyes 24, through which the transverse pivot 13 passes. The bolts or screws 22 are capable of vertical adjustment by means of nuts 23, which when tightened firmly secure the transverse pivot in its adjustment. By loosening one of the nuts and tightening the other, the adjacent side of the transverse pivot may be raised or lowered to cant the plow beam and to plow either to the right or to the left in order to set the plow in a true vertical position and cause it to run true. The end portions of the transverse pivot also pass through eyes 25 of threaded longitudinal rods or bolts 26, located at opposite sides of the front portion of the plow beam 3 and slidable through openings 27 of inwardly extending lugs 28, located at the rear ends of the sides 6 and 7 of the bracket and preferably formed by bending the terminals of the sides at right angles.

The eyes or front portions of the rods or bolts are arranged between the arms of the beam and the sides of the bracket, and they are curved longitudinally and have inner concave faces and outer convex faces to facilitate the horizontal swinging or lateral adjustment of the beam. The rods or bolts 26, which extend rearwardly from the terminal lugs or ears 27, support coiled springs 29, disposed on the rods or bolts and interposed between the terminal lugs 28 of the sides of the bracket and adjusting nuts 30, mounted on the rear ends of the rods or bolts and adapted to be adjusted to vary the tension of the springs, which operate in addition to the draft on the plow to force a plow back into line quickly after passing a rock or other obstruction deflecting the plow from its proper position. The springs 29 yieldably maintain the transverse pivot 13 at the rear ends of the longitudinal slots 12, and when a plow comes in contact with a rock or other obstruction, they permit the plow to swing laterally out of the way, as illustrated in Fig. 1 of the drawings, and prevent the plow from being bent or otherwise injured and from interfering with the operation of the other plows of the gang. The springs 29 are also adapted to hold the plows in their normal position with relation to each other when the said plows are lifted out of the ground. The lateral movement or adjustment of the pivot also enables the plows to be properly arranged the desired distance apart, and they are maintained normally at the desired lateral adjustment by means of a pair of cams 31, mounted on the outer faces of the sides 6 and 7 of the bearing bracket, and consisting of disks eccentrically pivoted by screws 32, or other suitable fastening means. The screws 32, which pass through eccentrically arranged openings 33 in the disks, engage threaded openings 34 in the sides 6 and 7 of the bracket. By partially rotating the cams, the terminal portions of the transverse pivot may be adjusted forwardly or rearwardly, the coiled springs 29 operating to maintain the transverse pivot in contact with the front engaging edges of the said cams.

The device forms an exceedingly flexible joint and permits the plow to work up and down easily and quickly on uneven ground and affords a wide range of flexibility in lateral or sidewise movement for dodging rocks, stumps and other obstructions. As the draft of the plow is on both the forwardly diverging arms, the plow will always hang true except when forced to one side by some obstruction. The flexible connection adapts the gang plow for plowing on short curves and enables the gang plow to make very short turns without liability of springing the beams.

What is claimed is:—

1. A device of the class described including a fixed bracket having spaced sides, a transverse pivot mounted in the sides of the bracket and having a limited horizontal swinging movement within the same, and a plow beam hinged to the bracket by the said pivot and adapted to swing upwardly and downwardly on the pivot and capable of lateral movement with the pivot.

2. A device of the class described including a bracket having spaced sides, a transverse pivot mounted in the sides of the bracket and having a limited horizontal swinging movement, a plow beam hinged to the bracket by the said pivot and adapted to swing upwardly and downwardly on the pivot and capable of lateral movement with the pivot, and springs connected with the terminal portions of the transverse pivot for yieldably maintaining the said pivot in its normal position.

3. A device of the class described including a bracket having spaced sides, a transverse pivot mounted on the sides of the bracket and capable of a horizontal swinging movement, a plow beam hinged to the bracket by the said pivot, and means mounted on the bracket for adjusting the terminal portions of the pivot in a direction longitudinally of the bracket.

4. A device of the class described including a bracket designed to be mounted on the frame of a gang plow, a beam provided with spaced forwardly extending arms, a pivot connecting the arms to the bracket and having a horizontal movement in the bracket to permit the plow beam to swing vertically and laterally, and yieldable means for holding the pivot normally against such lateral movement and for returning the plow beam to its normal position after the same has been deflected.

5. A device of the class described including a bracket having spaced sides provided with longitudinal slots, a transverse pivot mounted in the slots, a plow beam hinged to the bracket by the said pivot, and cams mounted on the sides of the bracket and arranged to engage the terminal portions of the pivot for adjusting the same in the said slots.

6. A device of the class described including a bracket having spaced sides provided with longitudinal slots, a transverse pivot mounted in the slots, a plow beam hinged to the bracket by the said pivot, cams arranged at the sides of the bracket for adjusting the pivot and consisting of disks having eccentrically arranged openings, and screws mounted on the sides of the bracket and extending through the openings of the disks for securing the cams in their adjustment.

7. A device of the class described including a bracket, a transverse pivot slidably mounted in the bracket, a beam hinged to the bracket by the pivot, a longitudinal rod connected with the pivot, a spring disposed on the rod and arranged to urge the pivot rearwardly, and means for adjusting the tension of the spring.

8. A device of the class described including a bracket, a transverse pivot slidably mounted at its terminal portions in the said bracket, a plow beam hinged to the bracket by the said pivot, longitudinal rods connected at their front portions with the pivot at opposite sides of the beam, springs disposed on the rods for urging the same rearwardly, and means for adjusting the tension of the springs.

9. A device of the class described including a bracket having spaced sides provided with longitudinal slots and having lugs located in rear of the slots, a transverse pivot mounted in the slots, a beam hinged to the bracket by the pivot, longitudinal rods slidably mounted in the lugs of the bracket and connected at their front portions with the pivot and having threaded rear portions, nuts mounted on the rear portions of the rods, and springs disposed on the rods and interposed between the nuts and the sides of the bracket for urging the rods rearwardly, the tension of the springs being controlled by the adjustment of the nuts.

10. A device of the class described including a fixed bracket composed of spaced parallel sides of unequal length, a diagonally disposed front portion connecting the sides, means for rigidly securing the front portion to a suitable support, a brace connecting the front portion of the bracket with the longer side thereof, a transverse pivot mounted in the bracket, a beam hinged to the bracket by the pivot, and means for adjusting the pivot.

11. A device of the class described including a bracket having spaced sides, a transverse pivot having its terminal portions slidably mounted on the sides of the bracket, a beam provided with forwardly divergent arms hinged to the bracket by the pivot and having their front terminal portions curved longitudinally, and spring controlled rods or bolts connected with the terminal portions of the pivot and curved to conform to the configuration of the terminal portions of the said arms.

12. A device of the class described including a bracket, a transverse pivot mounted on the bracket, a plow beam hinged to the bracket by the said pivot, and means for adjusting the beam to cant the same laterally with respect to the pivot.

13. A device of the class described including a bracket, a pivot mounted in the bracket, a plow beam provided with arms spaced apart and pivoted to the bracket by the said pivot, and means for adjusting one of the arms vertically with respect to the pivot.

14. A device of the class described including a bracket, a transverse pivot mounted on the bracket, a plow beam having spaced arms provided with openings through which the pivot passes, one of the openings being elongated vertically, and adjusting means connected with such arm and with the pivot for raising and lowering the former with respect to the latter.

15. A device of the class described including a bracket, a transverse pivot mounted on the bracket, a beam having spaced arms hinged to the bracket by the pivot, one of the arms being provided with a vertical head having a slot to receive the said pivot and provided with projecting lugs or ears, and screws mounted in the lugs or ears and connected with the pivot for adjusting the said head vertically with respect to the pivot.

16. A device of the class described including a bracket having spaced sides provided with longitudinal slots, a transverse pivot mounted in the slots, spring controlled longitudinal rods slidably mounted on the bracket and connected with and extending rearwardly from the terminal portions of the pivot, a plow beam having spaced arms hinged to the bracket by the pivot, one of the arms being provided with a vertical slot or opening to permit such arm to be raised and lowered with respect to the pivot, and vertical adjusting screws connected with and extending upwardly and downwardly from the pivot and connected with the slotted arm for raising and lowering the same.

In testimony, that I claim the foregoing as my own, I have hereto affixed my signature in the presence of two witnesses.

WILLIAM THOMAS BENNETT.

Witnesses:
F. W. SEXTON,
E. L. GOODWIN.